(12) United States Patent
Yamashita et al.

(10) Patent No.: US 7,447,266 B2
(45) Date of Patent: Nov. 4, 2008

(54) DECODING DEVICE AND DECODING PROGRAM FOR VIDEO IMAGE DATA

(75) Inventors: Kazuhiro Yamashita, Yokohama (JP); Kenji Orita, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 906 days.

(21) Appl. No.: 11/020,109

(22) Filed: Dec. 27, 2004

(65) Prior Publication Data

US 2006/0023789 A1   Feb. 2, 2006

(30) Foreign Application Priority Data

Jul. 27, 2004   (JP)   ............................. 2004-218648

(51) Int. Cl.
*H04N 7/12*   (2006.01)

(52) U.S. Cl. ............. 375/240.25; 375/240; 375/240.01; 375/240.12; 375/240.24

(58) Field of Classification Search ................. 375/240, 375/240.01, 240.12, 240.16, 240.24, 240.25
See application file for complete search history.

(56) References Cited

U.S. PATENT DOCUMENTS 6,263,023 B1 *   7/2001   Ngai ...................... 375/240.12

FOREIGN PATENT DOCUMENTS

| JP | 4-170654 | 6/1992 |
|---|---|---|
| JP | 6-180669 | 6/1994 |
| JP | 11-215509 | 8/1999 |

* cited by examiner

*Primary Examiner*—Allen Wong
(74) *Attorney, Agent, or Firm*—Hanify & King, P.C.

(57) ABSTRACT

A decoding device comprises a cache memory for temporally storing video image data, a unit for determining a position of a reference macroblock corresponding to macroblock to be decoded based on a motion vector obtained by analyzing an encoded bitstream, and a unit for determining whether or not a reference macroblock includes a cacheline boundary when data of the reference macroblock is not stored in the memory and for specifying the position of the boundary as a front address for the data preload from a memory storing the data of the reference macroblock.

11 Claims, 16 Drawing Sheets

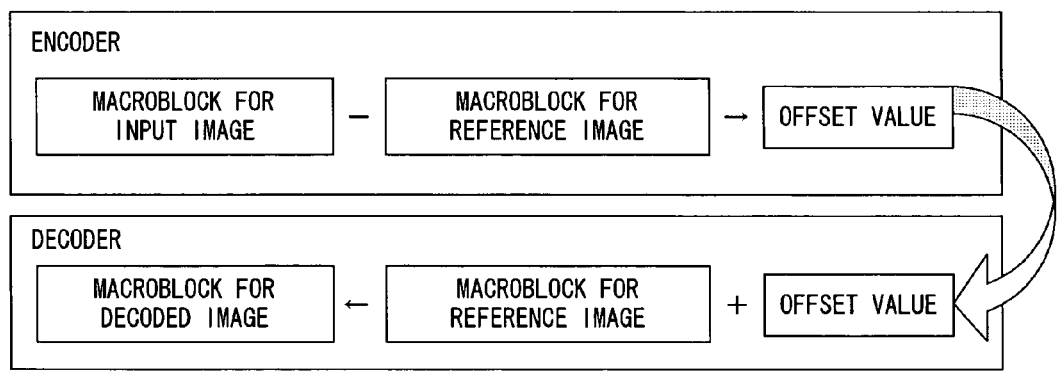
F I G. 1

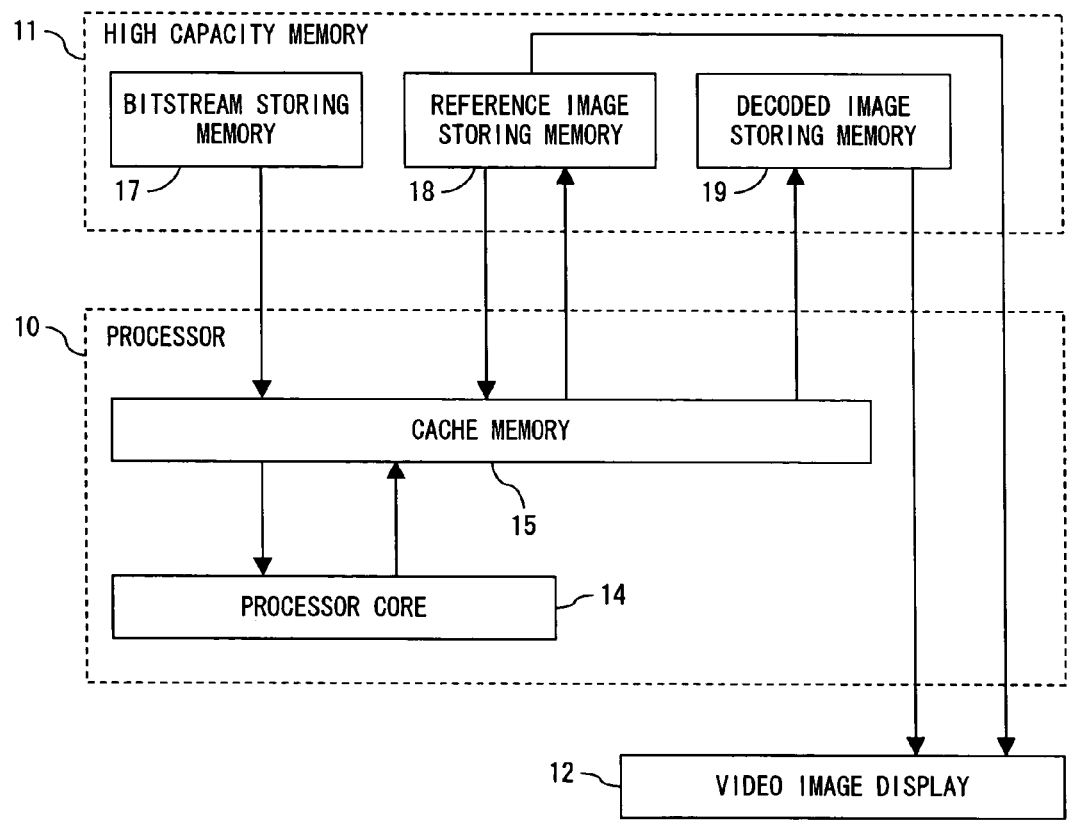
F I G. 7

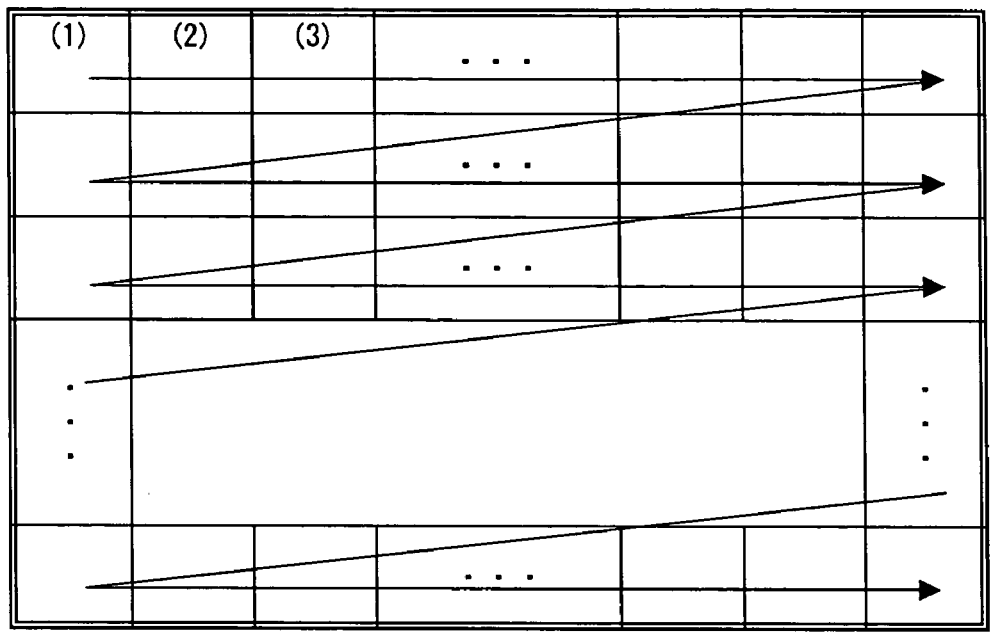
 DECODED IMAGE MACROBLOCK
 DECODED FRAME IMAGE
FIG. 8

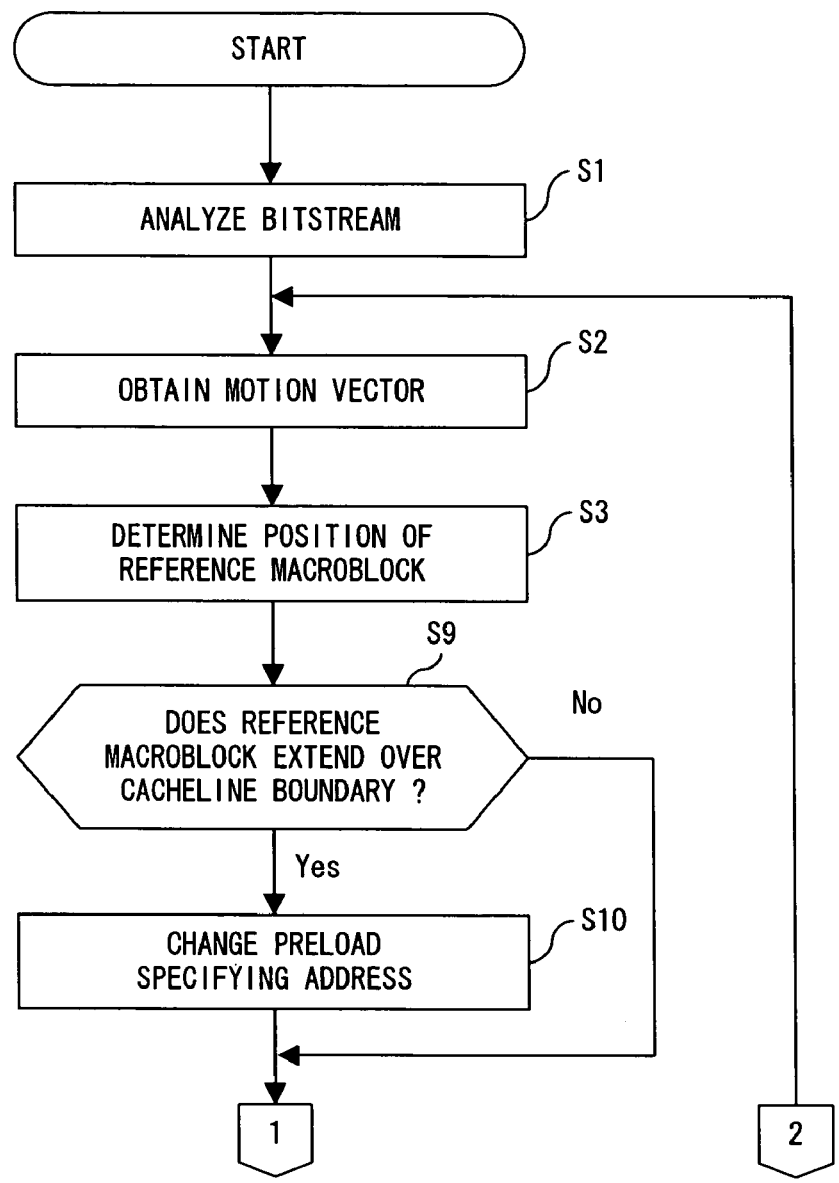
F I G. 9

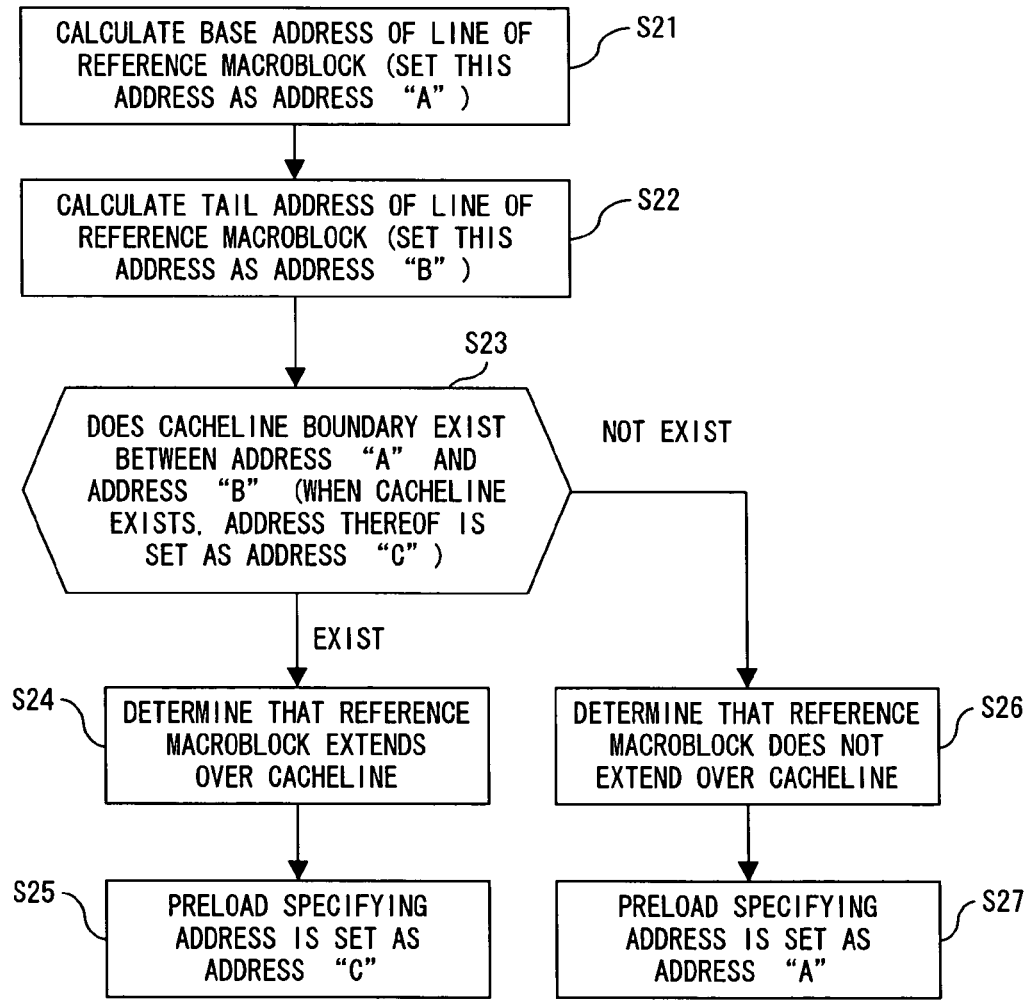
F I G. 1 1

US 7,447,266 B2

DECODING DEVICE AND DECODING PROGRAM FOR VIDEO IMAGE DATA

BACKGROUND OF THE INVENTION

1. Field of the Invention

The present invention relates to a method of compressing a video image, and more particularly to a decoding device and a decoding program for video image data in which a decoding processing is conducted, in a high speed, on a bitstream being encoded by using interframe prediction method on a processor system including a cache memory.

2. Description of the Related Art

In recent years, video image data is expressed in digital data and is used for such purposes as an image distribution service by being stored in digital media or via network communications, digital television broadcastings using satellites, or the like. Generally, a video image includes a large data amount. Therefore, a video image is compressed in accordance with a compression encoding technique in order to reduce the data amount, and is decoded for the reproduction of the video image. In MPEG (Moving Picture Expert Group) system as an international standard for video image compression protocol, video image data is encoded into a bitstream.

FIG. 1 explains a schematic of interframe prediction method. A frame image is divided into units of macroblocks of rectangular regions each having a size of 16 pixels vertically and 16 pixels horizontally. An interframe prediction is conducted in each unit of macroblocks. In an interframe prediction method, an offset value is encoded which value is obtained by subtracting each pixel value of a macroblock for reference image from a pixel value of each pixel of an input macroblock when the video image data is encoded.

A macroblock for reference image herein unit image data of a region specified by motion vector information, which is extracted, in a size of a macroblock, out of an input image block. The motion vector information is given to a decoder together with the offset value. In the decoder, a decoded image macroblock can be obtained by synthesizing the offset value and a pixel value of a macroblock for reference image.

FIG. 2 explains the above decoding processes in other words, a motion compensation processing. FIG. 3 is a flow chart of the motion compensation processing of a conventional example. Firstly having a focus on the flow chart of FIG. 3, encoded bitstream, i.e. a bitstream which has been encoded and transmitted is analyzed in step S1. In step S2, a motion vector is obtained. In step S3, a position of a reference macroblock on a reference frame corresponding to the above motion vector is determined. In step S4, a preload of a reference macroblock is conducted. This preload is conducted in order to load image data of a reference macroblock from an external memory when the image data of the reference macroblock is not stored in a cache memory in a processor. Generally a video image includes a very large data amount and it is rare that pixel data corresponding to all of the pixels in a reference macroblock are stored in a cache memory. This is the reason why an order for a preload is issued at the above timing in order to avoid the decline of performance due to a caching failure.

Next, in step S5, an offset value between the macroblocks, in other words, the offset value between the macroblock for input image and the macroblock for reference image, as described in FIG. 1, is obtained from a bitstream. In step S6, a decoded macroblock is created by synthesizing the pixel data of the offset value and the pixel data of the reference macroblock. In step S7, it is determined whether or not the decoding processes for all of the macroblocks on the frame are completed and if the processes are not completed, the processes to be conducted in step S2 and the following steps are repeated for the macroblock in a next position to be decoded. When it is determined that the decoding processes for all of the macroblocks on the frame are completed, the decoded frame image is output in step S8 and the processes are completed.

As described above, decoding processes of a video image requires a great deal of calculations due to a very large amount of data included therein. However, recently, also various types of devices incorporating processors are required to be able to reproduce a video image. In order to reproduce a video image, it is desirable that a cache memory is provided and image data of the reference frame is stored in that cache memory as much as possible prior to the decoding of the image data. However, the size of the reference frame image is much larger than that of the cache memory and also, there are various limitations about increase of the size of the cache memory in view of the requirement for a lower cost and a lower power consumption of the devices.

As described above, because there are limitations on a size of a cache memory, the occurrence rate of cache miss is raised, therefore, there is a problem that memory access performance declines due to a prolonged time for loading of data to an external memory, a main memory, or the like in case that a cache miss occurs. Especially in a video image data decoding device employing a motion compensation technique, there is a problem that the decoding processes in a higher speed can not be realized due to a decline of memory access performance caused by the occurrence of a cache miss, because such a decoding device accesses to the reference frame image frequently.

In order to avoid the decline of access performance due to a cache miss, a preload processing is conducted in order to store data of a reference macroblock in a cache memory at a time when a position of a macroblock is determined as described above. Because a processor can conduct other processes after making an order of preload, a time for data accessing can be free of a consciousness by a user.

However, even in a configuration that such a preload is conducted, there is a problem that a necessary preload of a region is not conducted or a loaded region is again preloaded prior to the region not preloaded, depending on a position of a reference macroblock, leading to a decline of memory access performance.

FIGS. 4 and 5 explain a problem of such a conventional preloading method. FIG. 4 explains a case that when a cacheline boundary is included in a line of a reference macroblock and a reference macroblock extends over the cacheline, a cache miss is caused because a region beyond the cacheline is not preloaded. Specifically, in FIG. 4, because a preload specifying address is set to a front address of a line of a reference macroblock (reference rectangular region), while region "A" as a region not beyond the cacheline is preloaded, region "B" which is beyond the cacheline is not preloaded, therefore, a cache miss is caused after the preload, leading to a decline of memory access performance.

FIG. 5 explains a case that a preloaded region is again preloaded prior to the region not preloaded. In FIG. 5, a macroblock depicted by a dashed line shows a reference macroblock referred to upon decoding a macroblock immediately prior to the current macroblock, and as for the lines included in the immediately prior macroblock, the portions up to the cacheline boundary is already preloaded. Accordingly, in FIG. 5, region "A" is a region shared duplicately by the immediately prior macroblock and the current macroblock, and region "B" is a region which is already preloaded at a time of the preload of the immediately prior macroblock, although the region "B" is not duplicately shared.

To the contrary, region "C" is a region which has to be preloaded at a time of the preload of the current reference macroblock. Because, a preload of a reference macroblock is conventionally conducted in the order of from a higher line to a lower line, a preload is conducted from line (1) in FIG. 5. Accordingly, the preload of lines (3) and (4) which actually have to be preloaded is conducted posterior to the preload of lines (1) and (2). And when a time for other processes conducted in parallel to the preload is short, a preload processing is completed with lines (3) and (4) remaining not preloaded. This situation results in an occurrence of cache miss and may cause the decline of memory access performance.

There are following prior arts about the above described decoding of video data employing a motion compensation technique or a control of cache memory related to such a system.

[Patent literature 1] Japanese Unexamined Patent Application Publication No. 4-170654 "Cache Memory Controlling System"

[Patent literature 2] Japanese Unexamined Patent Application Publication No. 6-180669 "Cache System"

[Patent literature 3] Japanese Unexamined Patent Application Publication No. 11-215509 "Motion Compensation Processing Method and System, and Storage Medium for Storing Processing Program thereof"

In patent literature 1, a cache memory controlling system is disclosed in which when a data length for one line in one image data is constant and the data length for one line for each image data is not constant, a data length for one line is specified as a data length of one entry of a cache memory for each image data so that a hit ratio of the caching is increased.

In patent literature 2, a technique is disclosed in which, in case of cache miss, data which is not successive on a main memory but positioned around the cache-missed data on the frame is stored in a cache memory so that a hit rate is improved.

In patent literature 3, a technique is disclosed in which data of a reference region is preloaded to a cache memory, corresponding to an address of a region next, in right, to the reference region specified by a motion vector so that a hit rate is improved upon extension of the next macroblock in order to realize a motion compensation in a higher speed.

However, these techniques do not solve a problem that a region beyond a cacheline boundary is not preloaded as explained in FIG. 4, or a problem that an already preloaded region is preloaded prior to the region not preloaded as explained in FIG. 5.

SUMMARY OF THE INVENTION

It is a first object of the present invention to reduce an occurrence rate of a cache miss after a preload of a reference macroblock even when a line of the reference macroblock includes a cacheline boundary. It is a second object of the present invention to provide a configuration to preload a not preloaded region prior to an already preloaded region on a reference macroblock. And it is a further object of the invention to improve a memory access performance upon video image data decoding, by achieving the above objects.

A video image data decoding device of the present invention is a device employing a motion compensation technique, comprising a cache memory for temporally storing image data, a reference macroblock position determining unit for determining a position of a reference macroblock on a reference frame corresponding to a macroblock to be decoded based on a motion vector obtained by analyzing an encoded bitstream, and a preload address specifying unit for determining whether or not the reference macroblock includes a cacheline boundary when data of the reference macroblock is not stored in the cache memory, and for specifying a position of the cacheline boundary as a front address for the data preload from the memory storing the data of the reference macroblock when the reference macroblock includes the cacheline boundary.

BRIEF DESCRIPTION OF THE DRAWINGS

FIG. 1 explains an interframe prediction method;

FIG. 7 is a block diagram showing a system configuration of a video image data decoding device;

FIG. 8 explains a method of scanning a macroblock at a time of decoding in an embodiment of the present invention;

FIG. 9 is a first detailed flow chart of a video image data decoding processing of an embodiment of the present invention;

FIG. 11 is a detailed flow chart of processes of steps S9 and S10 in FIG. 9;

DESCRIPTION OF THE PREFERRED EMBODIMENTS

Figure 6:
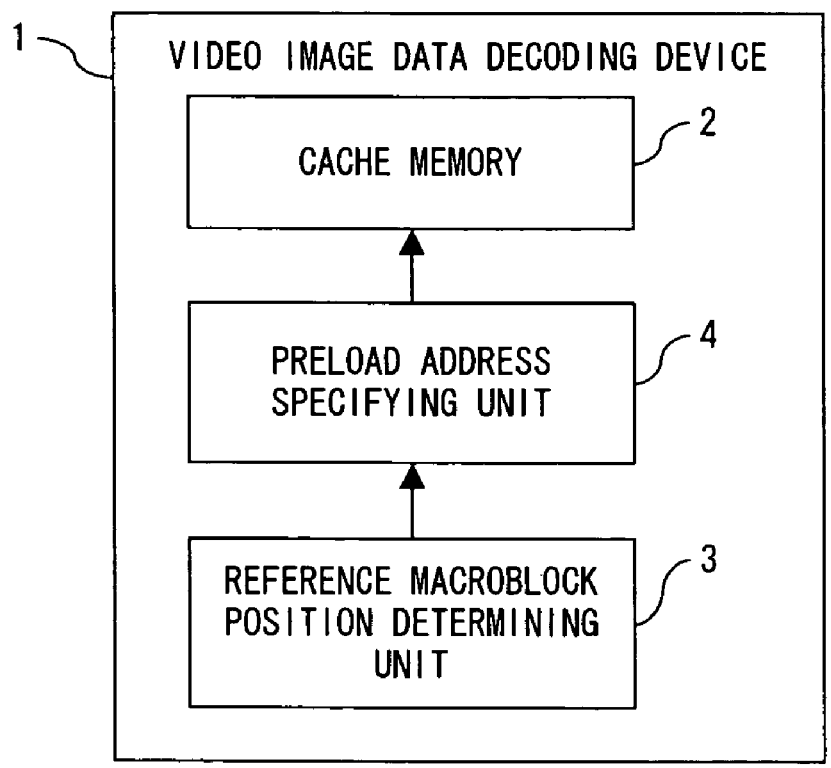
FIG. 6 is a block diagram showing a principle configuration of a video image data decoding device of the present invention.

FIG. 6 is a block diagram showing a principle configuration of a video image data decoding device of the present invention. In FIG. 6, a decoding device 1 employs a motion compensation technique and comprises a cache memory 2, a reference macroblock position determining unit 3 and a preload address specifying unit 4.

The cache memory 2 temporally stores video image data. The reference macroblock position determining unit 3 determines a position of a reference macroblock on a reference frame corresponding to a macroblock to be decoded. The preload address specifying unit 4 determines whether or not a reference macroblock includes a cacheline boundary when data of the reference macroblock is not stored in the cache memory 2, and specifies a position of the cacheline boundary as a front address for the data preload from a memory storing the data of the reference macroblock when the reference macroblock includes the cacheline boundary.

The video image data decoding device of the present invention comprises the above described cache memory, the reference macroblock position determining unit and a preload line priority determining unit.

The preload line priority determining unit determines which of the immediately prior reference macroblock or the current reference macroblock is positioned in a higher position on the frame by comparing the position of the immediately prior reference macroblock and the current reference macroblock when data of the reference macroblock is not stored in a cache memory. The preload line priority determining unit determines the order of the preload such that the data preload from a memory storing data of the reference macroblock is conducted, giving a priority to the highest line, from the highest line sequentially to the lowest line when the current reference macroblock is positioned higher than the immediately prior reference macroblock. And the preload line priority determining unit determines the order of the preload such that the data preload is conducted, giving a priority to the lowest line, from the lowest line sequentially to the highest line when the current reference macroblock is positioned lower than the immediately prior reference macroblock.

Next, a program used for a computer of the present invention which decodes video image data causes the computer to execute a processing of determining a position of a reference macroblock on a reference frame corresponding to a macroblock to be decoded based on a motion vector obtained by analyzing an encoded bitstream, and a processing of determining whether or not the macroblock includes a cacheline boundary when data of the reference macroblock is not stored in a cache memory in order to specify the position of the cacheline boundary as a front address for the data preload from the memory storing the data of the reference macroblock when the reference macroblock includes the cacheline boundary.

Also, a program used for a computer which decodes video image data employing a motion compensation technique in the present invention causes the computer to execute a processing of determining a position of a reference macroblock as described above, and a preload line priority determining processing of determining whether or not a current reference macroblock is positioned in a higher position than an immediately prior reference macroblock on a frame when data of the reference macroblock is not stored in the cache memory in order to determine the order of the preload such that the data preload from a memory storing data of the reference macroblock is conducted, giving a priority to the highest line, from the highest line sequentially to the lowest line when the current reference macroblock is positioned higher than the immediately prior reference macroblock, and in order to determine the order of the preload such that the data preload is conducted, giving a priority to the lowest line, from the lowest line sequentially to the highest line when the current reference macroblock is positioned lower than the immediately prior reference macroblock.

In an embodiment of the present invention, a program used for a computer which decodes video image data employing a motion compensation technique can be a program to cause the computer to conduct the above described macroblock position determining processing, a preload front address specifying processing and a preload line priority determining processing.

Also, in the embodiment of the present invention, a computer readable portable storage medium storing the programs such as above can be used, and also a video image data decoding method in which the processes by the programs as above are sequentially performed can be used.

According to the present invention, the occurrence rate of cache miss in a video image data decoding processing can be reduced, improving the memory access performance, which greatly contributes to the improvement of performances of various kinds of video image reproducing devices.

FIG. 7 is a block diagram showing a basic configuration of a video image data decoding device of the present invention. In FIG. 7, a decoding device basically comprises a processor 10, a high capacity memory 11 and a video image display 12. The processor 10 comprises a processor core 14 and a cache memory 15. The high capacity memory 11 comprises a bitstream storing memory 17, reference image storing memory 18 and a decoded image storing memory 19.

FIG. 8 explains a method of scanning a macroblock at a time of decoding in the present embodiment. In the present embodiment, macroblocks to be decoded on a frame image to be decoded are scanned in accordance with a general method of scanning. Specifically, the scanning is started from the highest line and proceeds from the left end macroblock to the right end macroblock in an order of (1), (2) to (3) one by one, in order to decode image data in a macroblock unit. Thereafter, as for the second and the following lines, a scanning is performed similarly from the left end macroblock to the right end macroblock.

Figure 2:
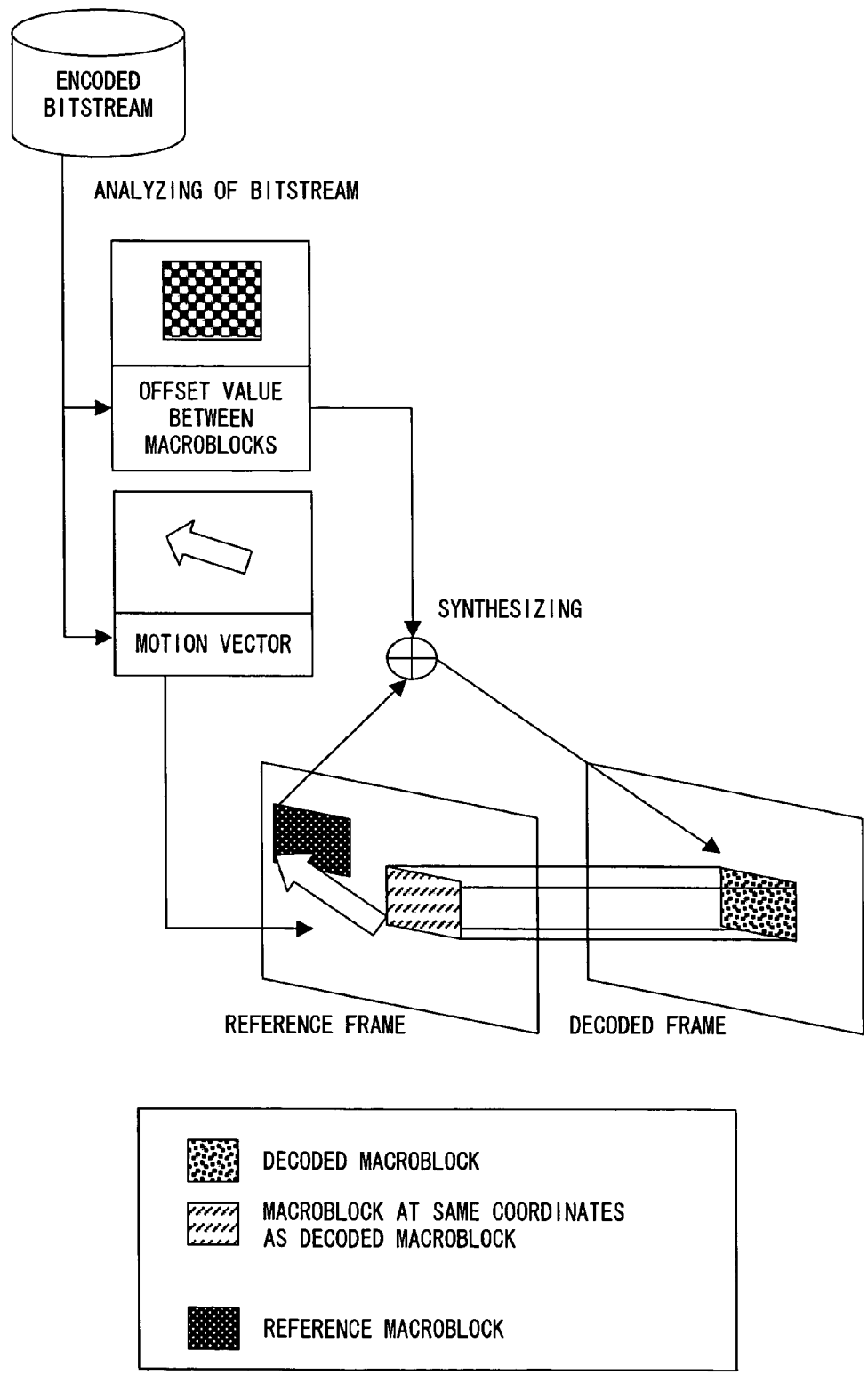
FIG. 2 explains a conventional motion compensation technique.
Figure 3:
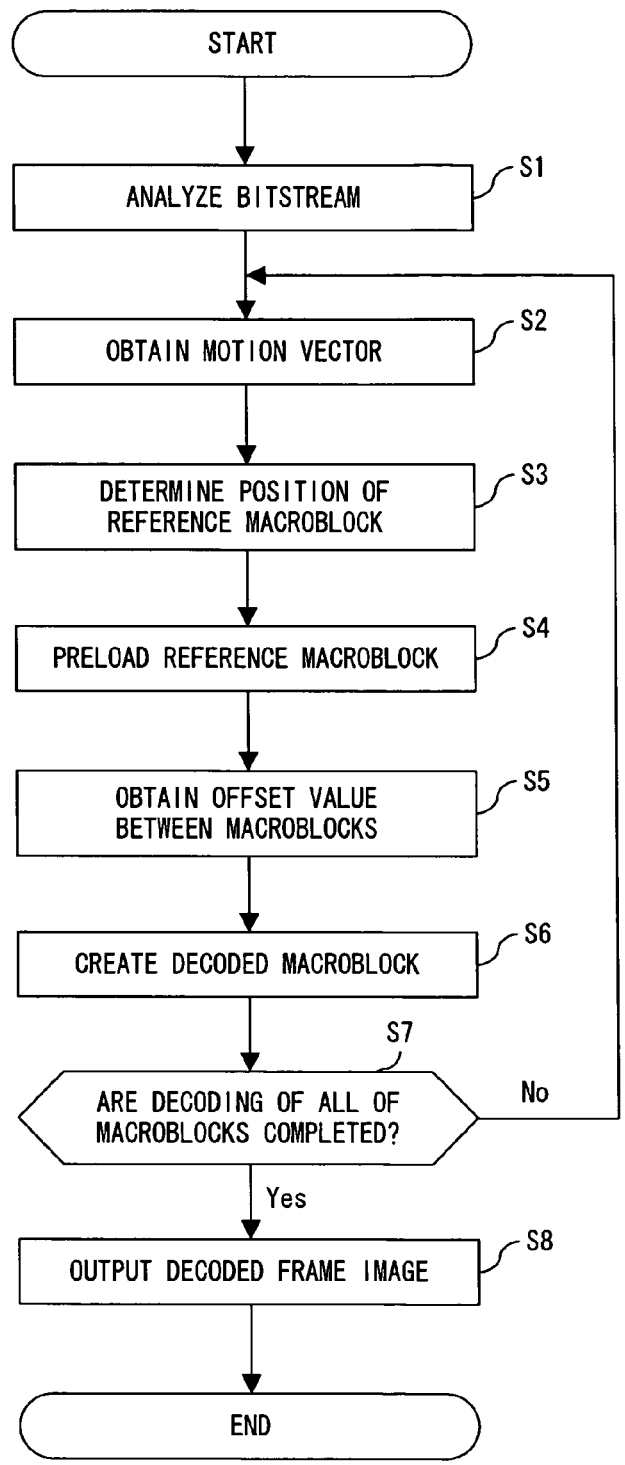
FIG. 3 is a flowchart of a conventional video image data decoding processing.
Figure 4:
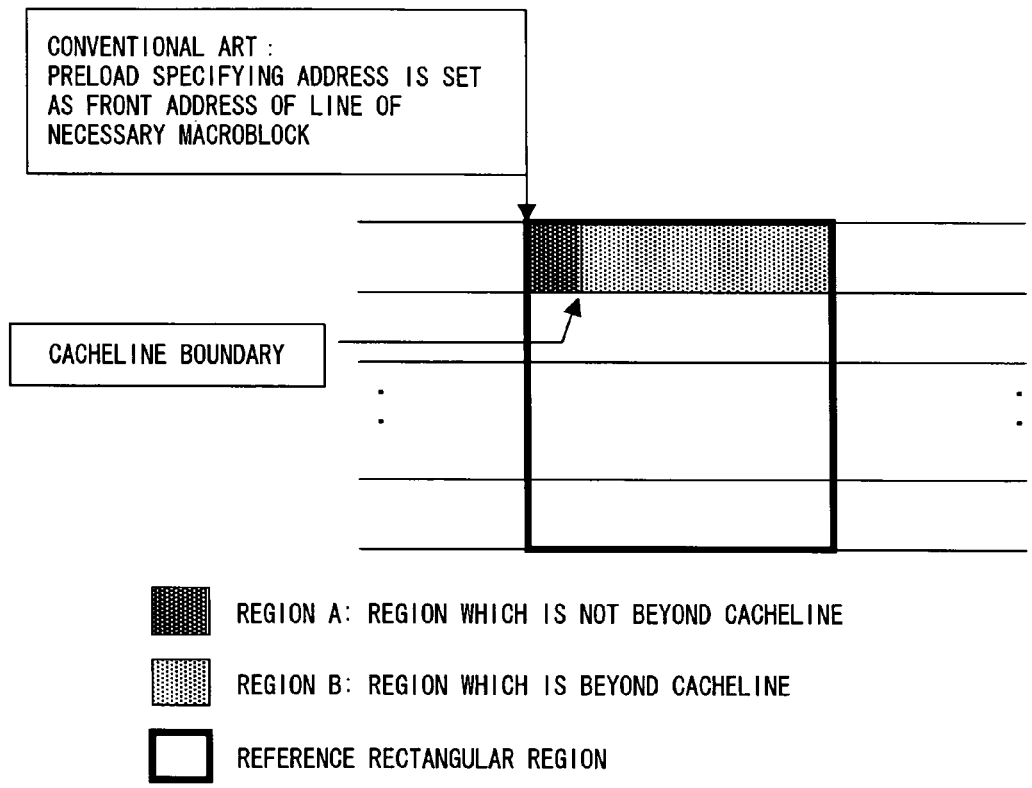
FIG. 4 explains a conventional processes in case that a reference macroblock extends over the cacheline boundary.
Figure 5:
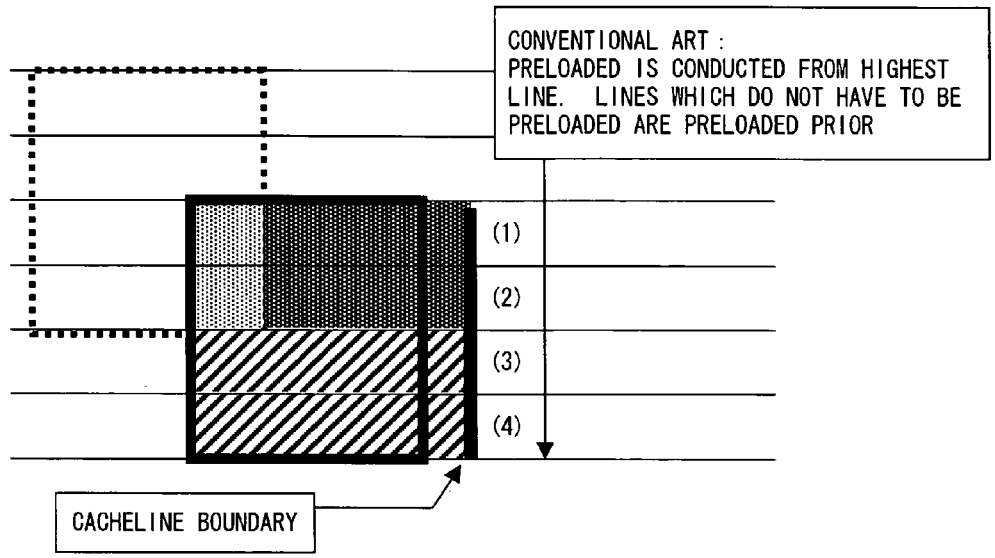
FIG. 5 explains a conventional process such a case that a region which is not needed to be preloaded is preloaded prior to a region which has to be preloaded.
Figure 10:
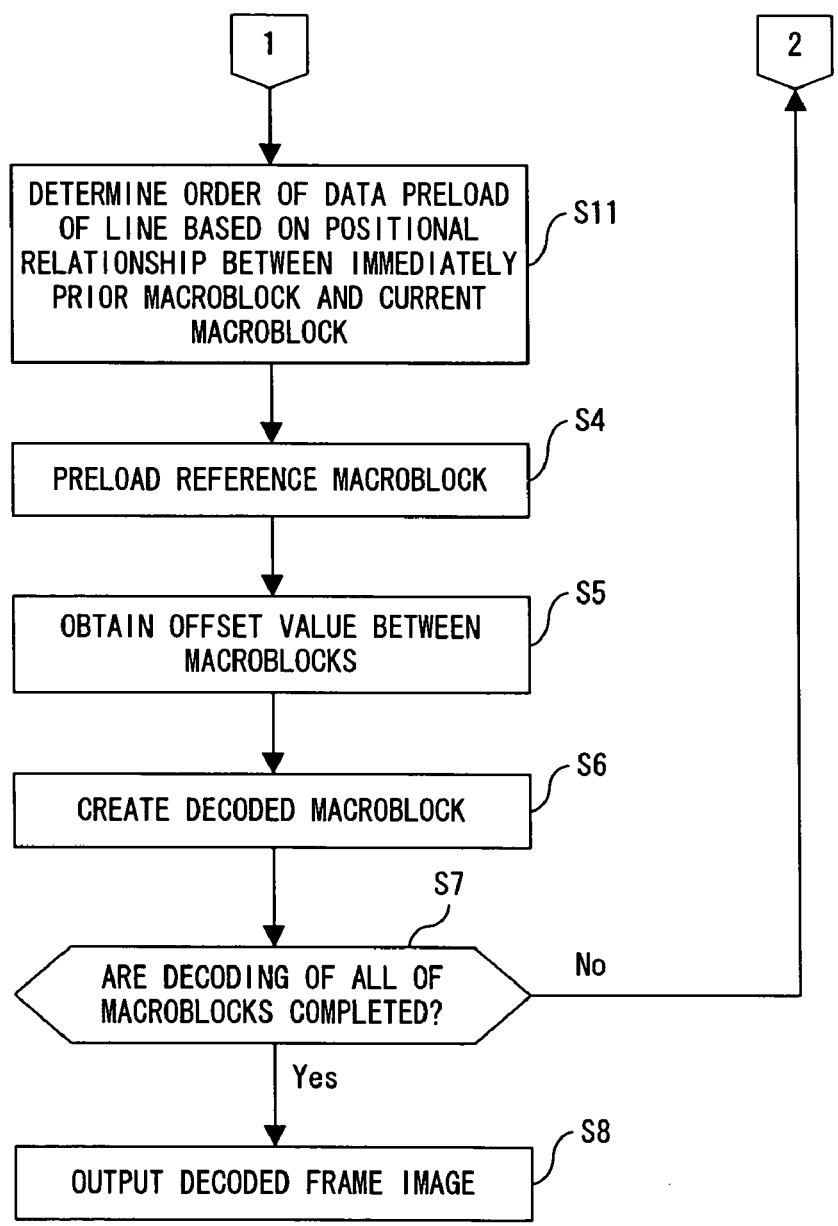
FIG. 10 is a second detailed flow chart of a video image data decoding processing of an embodiment of the present invention.

FIGS. 9 and 10 show a flow chart for a processing of video image data decoding which employs a motion compensation technique in the present embodiment. Comparing the flow chart with conventional flow chart of FIG. 3, the following points in FIGS. 9 and 10 are different from FIG. 3. Specifically, after a position of a reference macroblock is determined in step S3, it is determined, in step S9, whether or not the reference macroblock extends over the cacheline boundary as explained in FIG. 4 and when the reference macroblock extends over the cacheline boundary, a preload specifying address of data for each line of the reference macroblock is changed in step S10, thereafter, in step S11, a priority about the preload of the line of the reference macroblock is determined in a method of scanning of the immediately preceding macroblock referred to, that is, a macroblock explained in FIG. 8, based on a positional relationship between a reference macroblock at a time of decoding of the macroblock which is next, in left, to the macroblock to be currently decoded and a macroblock to be currently referred to, and after the above processes, a processing of step S4 and the following steps are conducted in the same manner as in FIG. 3. Also, at a time when a position of the reference macroblock is determined in step S3, a front address of the reference macroblock is once determined as a preload specifying address in the same manner as in a conventional technique and the address is not changed if the reference macroblock does not extend over the cacheline boundary.

Figure 12:
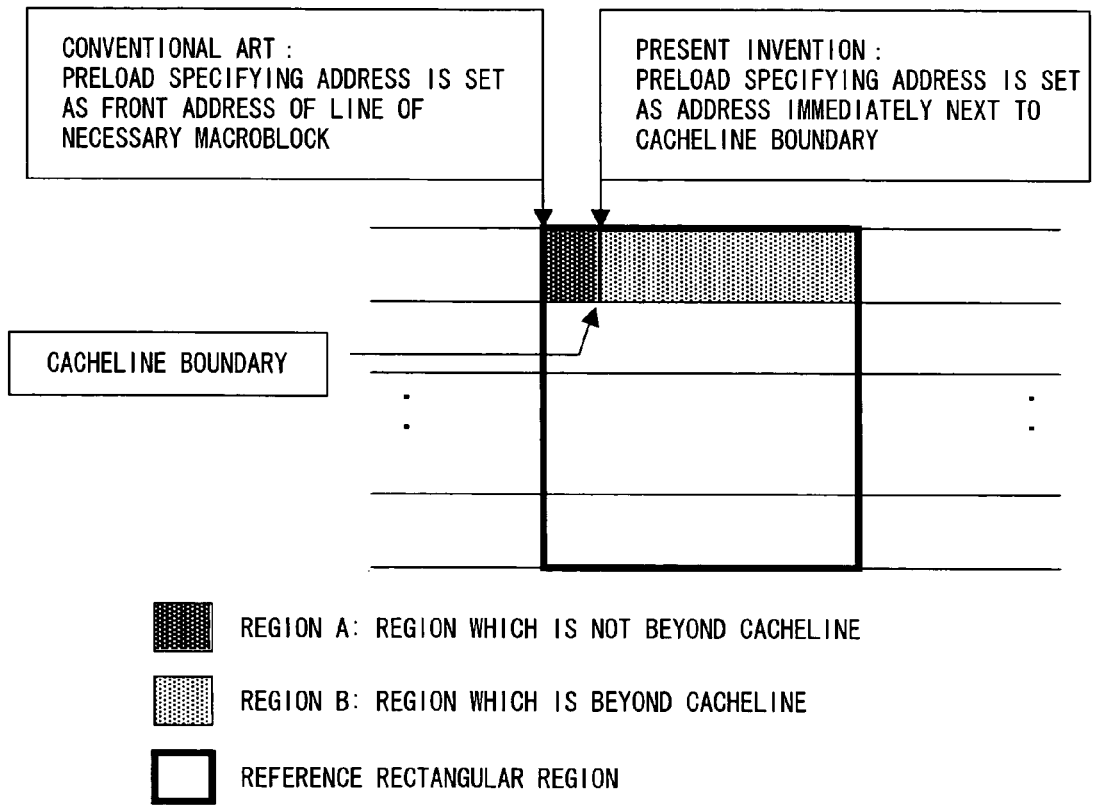
FIG. 12 explains a method of setting of a preload specifying address in case that a reference macroblock extends over a cacheline boundary.

FIG. 11 is a detailed flow chart of determining whether or not the reference macroblock in step S9 of FIG. 9 extends over the cacheline boundary, and of a processing of changing the preload specifying address in step S10. FIG. 11 will be explained referring to FIG. 12 explaining an address in case that the reference macroblock extends over a cacheline boundary. First, it is assumed that a base address of the highest line in the reference macroblock in FIG. 12 is "A", and the tail address of the line is "B". The cacheline boundary is located at address "C" and the address "C" exists between the address "A" and the address "B". Therefore, the reference macroblock extends over a cacheline boundary, accordingly it is determined that a line of the reference macroblock includes a cacheline boundary.

In step S21 of FIG. 11, a front address of a line of the reference macroblock including a cacheline boundary is calculated and set as the address "A", and the tail address of the line of the reference macroblock is calculated and set as the address "B" in step S22. Thereafter, it is determined whether or not a cacheline boundary exists between the address "A" and the address "B" and when the cacheline exists therebetween, the address of the cacheline is set as the address "C", and in step S24, it is determined that the reference macroblock extends over the cacheline and the preload specifying address, in other words, the front address for a preload is changed from the address "A" of the conventional example to the address "C" in step S25. When it is determined that there is not a cacheline boundary between the address "A" and the address "B" in step S23, it is determined that the reference macroblock does not extend over a cacheline boundary in step S26 and the preload specifying address is set as the frond address of the line i.e. the address "A". Note that step S10 in FIG. 9 correspond only to step S25 in FIG. 11, and the other steps in FIG. 11 correspond to step S9 in FIG. 9 including steps following step S11 in FIG. 10.

When the reference macroblock extends over a cacheline boundary as explained in FIG. 12, by changing the preload front address to the address "C", the region which is to be preloaded prior to the preload of the address "C" in the line, in other words, the region "A" in FIG. 12 is not preloaded in a decoding processing for the a macroblock of this time. Accordingly, there is a possibility that a cache miss occurs about this region "A", however, a method of scanning of macroblocks as described in FIG. 8 is employed, that is, a decoding processing is conducted starting from the left end macroblock of the line, thereby macroblocks near to the left end macroblock have stronger possibilities of being already preloaded than macroblocks near to the right end macroblock among all of the macroblocks of a reference frame image even when a motion vector is taken into account. Therefore, in many cases, the data of region "A" is already preloaded to a cache memory because the region "A" in FIG. 12 is in the left side of the reference macroblock. In the present embodiment, the occurrence rate of the cache miss is expected to be reduced by making an order for the preload of the data in response to such a characteristics of a video image data processes.

Figure 13:
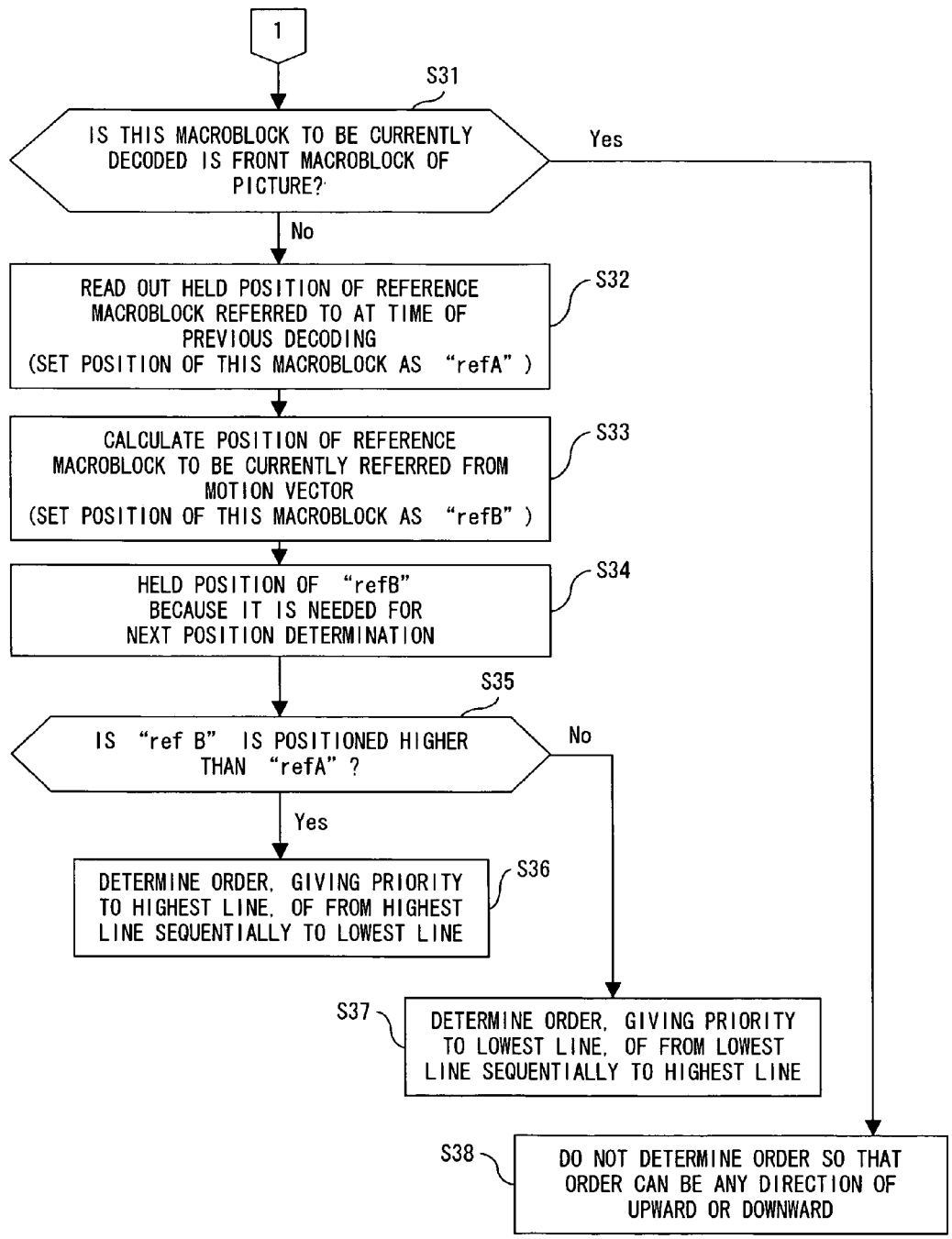
FIG. 13 is a detailed flow chart of a preload priority determining processing of a line on a reference macroblock in FIG. 10.

FIG. 13 is a detailed flow chart of a processing of step S11 in FIG. 10, specifically, a preload line priority determining processing of a line. FIG. 13 will be explained referring to FIGS. 14 and 15 explaining an example of preload line priority determination in a macroblock.

Figure 14:
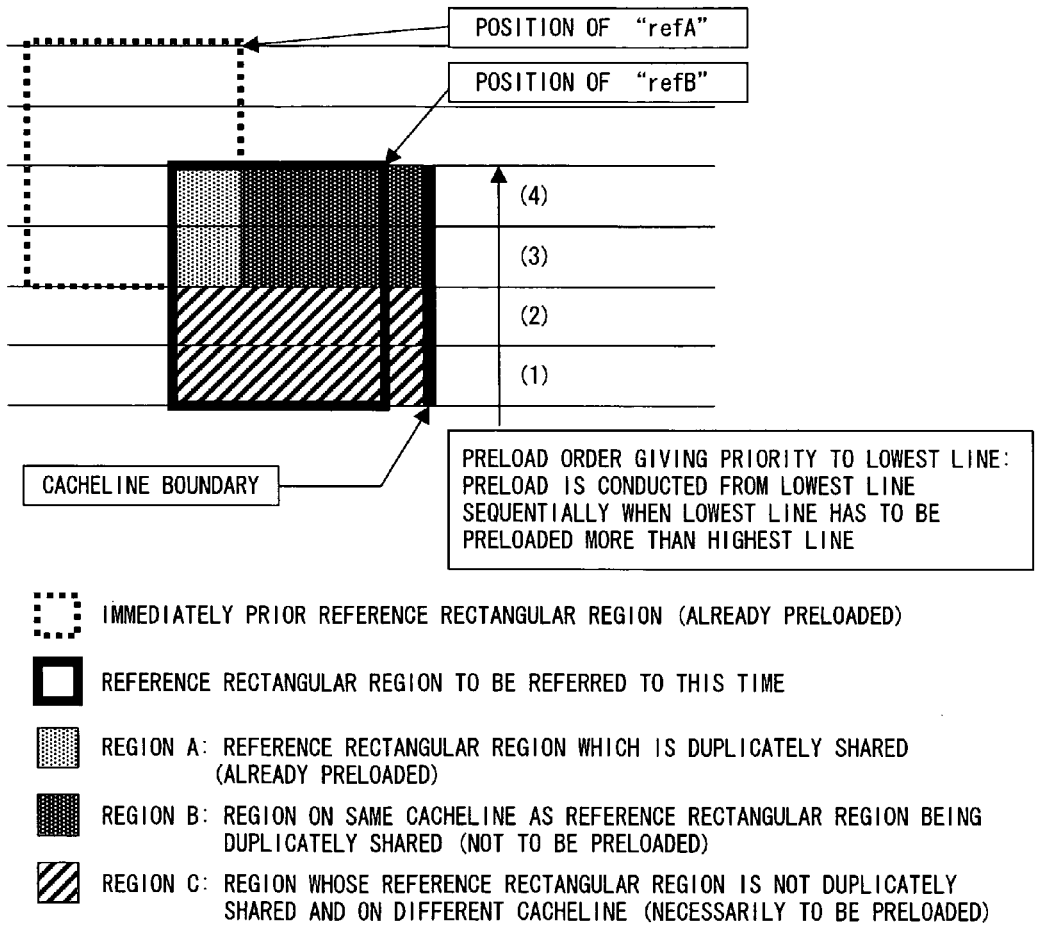
FIG. 14 explains an example of a preload priority determination of a line in case that a current reference macroblock is positioned lower than the immediately prior reference macroblock.

FIG. 14 explains an example of a determination of an order of a preload of lines giving a priority to the lowest line in a reference macroblock. In FIG. 14, a macroblock depicted by a dashed line shows a region of the previous macroblock, i.e. the immediately prior reference macroblock, the data of which region is already preloaded to cache memory. In this example, a position of the upper end of the current reference macroblock, i.e. a position of "refB" is lower than "refA" which is the upper end of the immediately prior reference macroblock.

Data for lower two lines of the immediately prior reference macroblock is already preloaded up to a cacheline boundary in a processing of the prior data preload, therefore, there is no need to preload the data for the upper two lines in the current reference macroblock. In the above two lines, a region "A" is duplicately shared while a region "B" is not duplicately shared. However the region "B" is a region whose data is already preloaded including data of a region up to a cacheline boundary beyond the right end of the current reference macroblock.

Therefore, upon a data preload of the current reference macroblock, it is necessary that lines which is not preloaded, i.e. the lower two lines have to be preloaded. In this condition, the possibility that the necessary data preload is completed is raised even when a time that can be used for the preload is short by conducting the data preload for each line, giving a priority to the lowest line, in the order of from the lowest line sequentially to the highest line.

Figure 15:
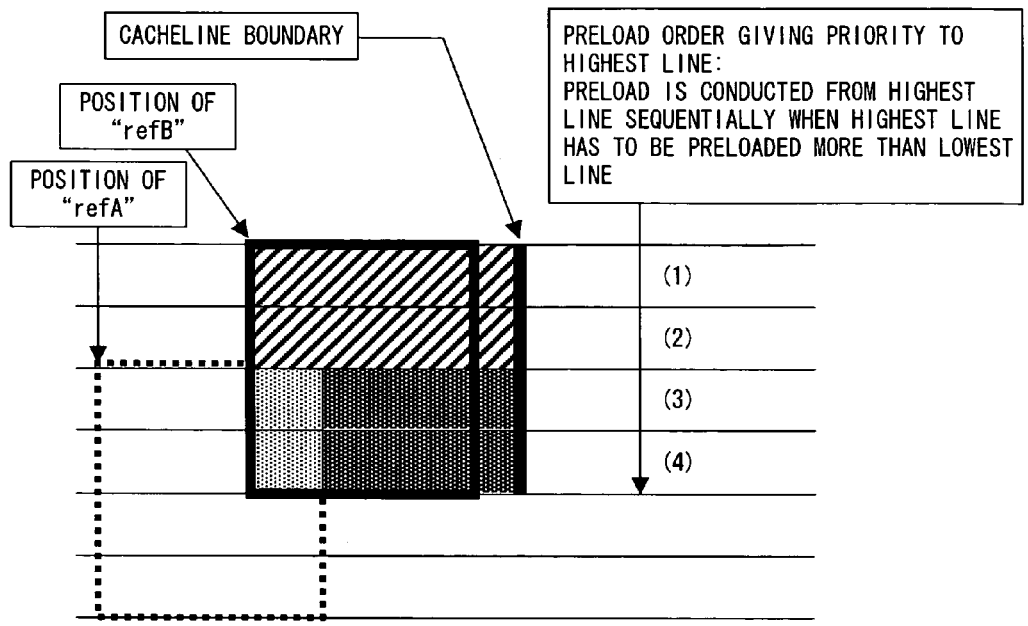
FIG. 15 explains an example of a preload priority determination of a line in case that a current reference macroblock is positioned higher than the immediately prior reference macroblock.

FIG. 15 shows a case that the current reference macroblock is positioned higher than the immediately prior reference macroblock. In this case, by conducting the data preload for each line in the order of from the highest line sequentially to the lowest line which is a reversed order from that in FIG. 14, a region which is not preload can be data preloaded more securely than a region which is already preloaded.

In FIG. 13 firstly in step S31, it is determined whether or not a macroblock to be currently decoded is a macroblock at a top position in a picture, in other words, a top position in a frame specifically, a position of "(1)" in FIG. 8. When the macroblock to be currently decoded is a top macroblock, it is not necessary to deal with a position of a prior reference macroblock. Therefore, it is decided that there is no need for a determination with regard to the priority about the lines to be preloaded in step S38, and that the order of the preload can be in any direction of the downward or the upward.

When a macroblock to be currently decoded is not a top macroblock of a picture, a position of the immediately prior macroblock stored in the device, i.e. "refA" is read out in step S32. In step S33, a position of the current reference macroblock, i.e. "refB" is calculated based on a motion vector. In step S34, the position of "refB" is held because the position of "refB" is needed upon decoding a next macroblock. In step S35, it is determined whether or not the position of "refB" is higher than that of "refA". When the "refB" is higher, which situation corresponds to FIG. 15, the order of the preload is determined such that a preload is conducted, giving a priority to the highest line, from the highest line sequentially to the lowest line in step S36. To the contrary, when the "refB" is lower, which situation corresponds to FIG. 14, the order of the preload is determined such that the preload is conducted, giving a priority to the lowest line, from the lowest line sequentially to the highest line in step S37.

As described above, in the present embodiment, a data preload can be conducted, giving a higher priority to a region which is assumed to be not preloaded than to a region which is assumed to be already preloaded in accordance with a positional relationship between a position of the current macroblock and a position of the immediately prior reference macroblock, and a situation can be avoided that the region which has to be preloaded fails to be preloaded even when an enough time cannot be used for a preload processing. Therefore, the occurrence rate of the cache miss can be reduced so that the memory access performance can be further improved.

Figure 16:
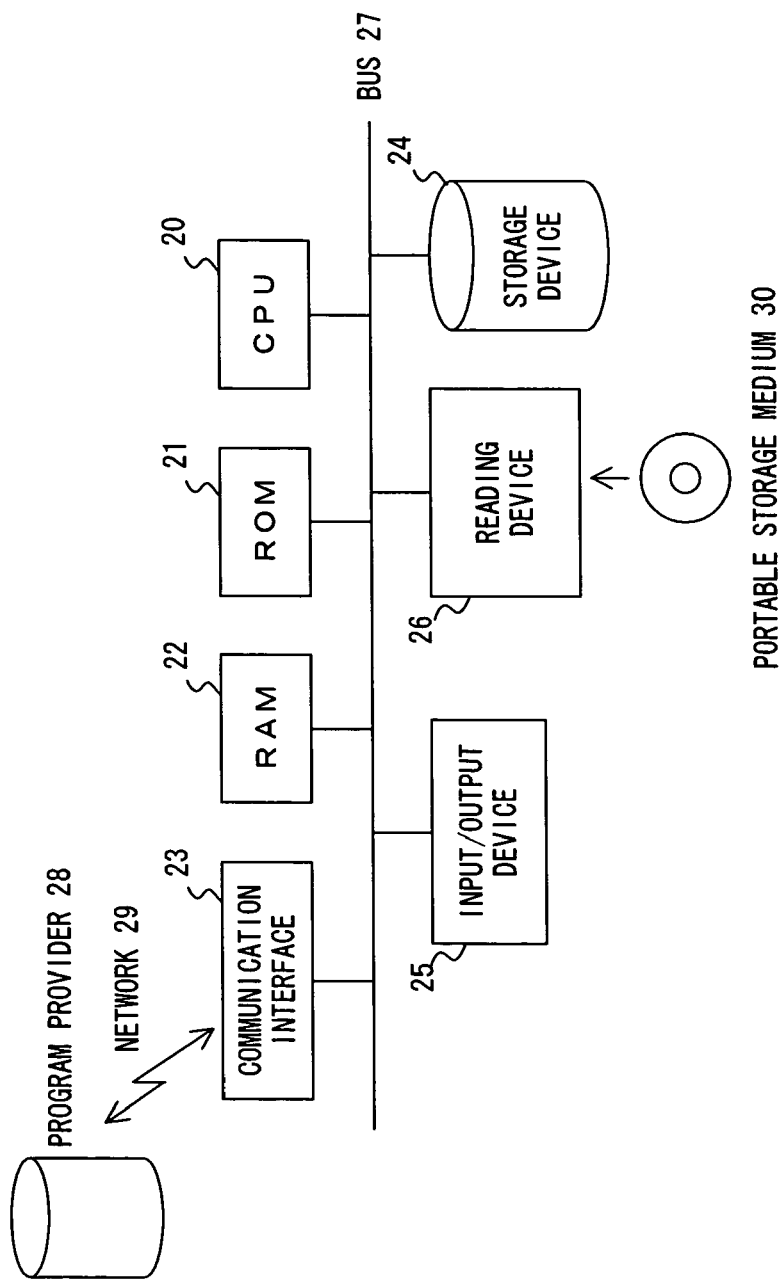
FIG. 16 explains a loading of a program to a computer, for realizing the present invention.

In the above, the detail of the video image data decoding device of the present invention is described, however, the decoding device can be configured based on a conventional computer system, as a matter of course. FIG. 16 is a block diagram showing a configuration of such a computer system, specifically a hardware environment.

In FIG. 16, the computer system comprises a central processing unit (CPU) 20, a read only memory (ROM) 21, a random access memory (RAM) 22, a communication interface 23, a storage device 24, an input/output device 25, a reading device for a portable storage medium 26 and a bus 27 to which all of the above components are connected.

As the storage device 24, various types of storage devices such as a hard disk, a magnetic disk, or the like can be used. The programs shown in the flow charts of FIGS. 9 to 11 and 13, or the programs which are described in claims 4 and 5 of the present invention are stored in the above storage device 24 or the ROM 21 in order to be executed by the CPU 20 so that a data preload of the region beyond a cacheline boundary, the avoidance of the preload of the already preloaded region prior to the not preloaded area or the like as described in the present embodiment can be realized.

Such programs as above can be stored, for example, in the storage device 24 through a network 29 and the communication interface 23, or can be stored in a commercially available portable storage medium 30 in order to be executed by the CPU 20 through a reading device 26. As a portable storage medium 30, various types of storage media such as a CD-ROM, a flexible disk, an optical disk, an optical magnetic disk, a DVD or the like can be used. The programs stored in such storage media are read out through the reading device 26 so that the memory access performance can be improved upon video image data decoding in the present embodiment.

What is claimed is:

1. A video image data decoding device employing a motion compensation technique, comprising:
   a cache memory for temporally storing image data;
   a reference macroblock position determining unit for determining a position of a reference macroblock on a reference frame corresponding to a macroblock to be decoded based on a motion vector obtained by analyzing an encoded bitstream; and
   a preload address specifying unit for determining whether or not the reference macroblock includes a cacheline boundary when data of the reference macroblock is not stored in the cache memory, and for specifying a position of a cacheline boundary as a front address for the data preload from the memory storing the data of the reference macroblock when the reference macroblock includes the cacheline boundary.

2. A video image data decoding device employing a motion compensation technique, comprising:
   a cache memory for temporally storing image data;
   a reference macroblock position determining unit for determining a position of a reference macroblock on a reference frame corresponding to a macroblock to be decoded based on a motion vector obtained by analyzing an encoded bitstream; and
   a preload line priority determining unit for determining which of an immediately prior reference macroblock or a current reference macroblock is positioned in a higher position on a frame by comparing the position of the immediately prior reference macroblock and the position of the current reference macroblock when data of the reference macroblock is not stored in the cache memory, for determining the order of the preload such that the data preload from a memory storing data of the reference macroblock is conducted, giving a priority to the highest line, from the highest line sequentially to the lowest line when the current reference macroblock is positioned higher than the immediately prior reference macroblock, and for determining the order of the preload such that the data preload is conducted, giving a priority to the lowest line, from the lowest line sequentially to the highest line when the current reference macroblock is positioned lower than the immediately prior reference macroblock.

3. The video image data decoding device according to claim 2, further comprising:
   a preload address specifying unit for determining whether or not the reference macroblock includes a cacheline boundary, and for specifying a position of the cacheline boundary as a front address for the data preload on the line to be data preloaded in accordance with a result of the determination by the preload line priority determining unit when the reference macroblock includes the cacheline boundary.

4. A method of decoding of video image data employing a motion compensation technique, comprising:
   determining a position of a reference macroblock on a reference frame corresponding to a macroblock to be decoded is determined based on a motion vector obtained by analyzing an encoded bitstream; and
   determining whether or not the reference macroblock includes a cacheline boundary when data of the reference macroblock is not stored in the cache memory, and a position of the cacheline boundary is specified as a front address for the data preload from the memory storing the data of the reference macroblock when the reference macroblock includes the cacheline boundary.

5. A method of decoding of video image data employing a motion compensation technique, comprising:
   determining a position of a reference macroblock on a reference frame corresponding to a macroblock to be decoded is determined based on a motion vector obtained by analyzing an encoded bitstream; and
   determining which of an immediately prior reference macroblock or a current reference macroblock is positioned in a higher position on a frame by comparing the position of the immediately prior reference macroblock and the position of the current reference macroblock when data of the reference macroblock is not stored in the cache memory, and the order of the preload is determined such that the data preload from a memory storing data of the reference macroblock is conducted, giving a priority to the highest line, from the highest line sequentially to the lowest line when the current reference macroblock is positioned higher than the immediately prior reference macroblock and determined such that the data preload is conducted, giving a priority to the lowest line, from the lowest line sequentially to the highest line when the current reference macroblock is positioned lower than the immediately prior reference macroblock.

6. The method of decoding of video image data according to claim 5, further comprising:
   determining whether or not the reference macroblock includes a cacheline boundary, and a position of the cacheline boundary is specified as a front address for the data preload on the line to be data preloaded in accordance with a result of the determination of the order about the line to be data preloaded when the reference macroblock includes the cacheline boundary.

7. A computer readable medium encoded with instructions capable of being executed by a computer for decoding video image data, comprising:
   a video image data decoding program for causing the computer to execute a step of determining a position of a reference macroblock on a reference frame corresponding to a macroblock to be decoded based on a motion vector obtained by analyzing an encoded bitstream, and a step of determining whether or not the reference macroblock includes a cacheline boundary when data of the reference macroblock is not stored in a cache memory and specifying a position of the cacheline boundary as a front address for the data preload from the memory storing the data of the reference macroblock when the reference macroblock includes the cacheline boundary.

8. A computer readable medium encoded with instructions capable of being executed by a computer for decoding video image data, comprising:

a video image data decoding program for causing the computer to execute a step of determining a position of a reference macroblock on a reference frame corresponding to a macroblock to be decoded based on a motion vector obtained by analyzing an encoded bitstream, and a preload line priority determining step of determining whether or not a current reference macroblock is positioned in a higher position than an immediately prior reference macroblock on a frame when data of the reference macroblock is not stored in the cache memory and determining the order of the preload such that the data preload from a memory storing data of the reference macroblock is conducted, giving a priority to the highest line, from the highest line sequentially to the lowest line when the current reference macroblock is positioned higher than the immediately prior reference macroblock and determining such that the data preload is conducted, giving a priority to the lowest line, from the lowest line sequentially to the highest line when the current reference macroblock is positioned lower than the immediately prior reference macroblock.

9. The computer readable medium encoded with instructions capable of being executed by a computer for decoding video image data according to claim 8, comprising a video image data decoding program for causing the computer to further execute a step of determining whether or not the reference macroblock includes a cacheline boundary, and of specifying a position of the cacheline boundary as a front address for the data preload on the line to be data preloaded from the memory storing the data of the reference macroblock, with the order determined by the preload line priority determining step, when the reference macroblock includes the cacheline boundary.

10. A video image data decoding device employing a motion compensation technique, comprising:

a cache memory for temporally storing image data;

reference macroblock position determining means for determining a position of a reference macroblock on a reference frame corresponding to a macroblock to be decoded based on a motion vector obtained by analyzing an encoded bitstream; and preload address specifying means for determining whether or not the reference macroblock includes a cacheline boundary when data of the reference macroblock is not stored in the cache memory, and for specifying a position of a cacheline boundary as a front address for the data preload from the memory storing the data of the reference macroblock when the reference macroblock includes the cacheline boundary.

11. A video image data decoding device employing a motion compensation technique, comprising:

a cache memory for temporally storing image data;

reference macroblock position determining means for determining a position of a reference macroblock on a reference frame corresponding to a macroblock to be decoded based on a motion vector obtained by analyzing an encoded bitstream; and preload line priority determining means for determining which of an immediately prior reference macroblock or a current reference macroblock is positioned in a higher position on a frame by comparing the position of the immediately prior reference macroblock and the position of the current reference macroblock when data of the reference macroblock is not stored in the cache memory, for determining the order of the preload such that the data preload from a memory storing data of the reference macroblock is conducted, giving a priority to the highest line, from the highest line sequentially to the lowest line when the current reference macroblock is positioned higher than the immediately prior reference macroblock, and for determining the order of the preload such that the data preload is conducted, giving a priority to the lowest line, from the lowest line sequentially to the highest line when the current reference macroblock is positioned lower than the immediately prior reference macroblock.

* * * * *